(12) United States Patent
Kim

(10) Patent No.: US 12,319,522 B2
(45) Date of Patent: Jun. 3, 2025

(54) LOADING BOX CHANGING SYSTEM FOR DELIVERY ROBOT

(71) Applicant: WOOWA BROTHERS CO., LTD., Seoul (KR)

(72) Inventor: Ju Hwan Kim, Yongin-si (KR)

(73) Assignee: WOOWA BROTHERS CO., LTD., Seoul (KR)

( * ) Notice: Subject to any disclaimer, the term of this patent is extended or adjusted under 35 U.S.C. 154(b) by 267 days.

(21) Appl. No.: 17/914,751

(22) PCT Filed: Mar. 22, 2021

(86) PCT No.: PCT/KR2021/003511
§ 371 (c)(1),
(2) Date: Sep. 26, 2022

(87) PCT Pub. No.: WO2021/201481
PCT Pub. Date: Oct. 7, 2021

(65) Prior Publication Data
US 2023/0348209 A1      Nov. 2, 2023

(30) Foreign Application Priority Data

Mar. 31, 2020   (KR) ........................ 10-2020-0039304
Jul. 21, 2020   (KR) ........................ 10-2020-0090132

(51) Int. Cl.
*B65G 67/02*      (2006.01)

(52) U.S. Cl.
CPC .................................. *B65G 67/02* (2013.01)

(58) Field of Classification Search
None
See application file for complete search history.

(56) References Cited

U.S. PATENT DOCUMENTS

| | | | |
|---|---|---|---|
| 9,656,806 | B2 | 5/2017 | Brazeau et al. |
| 9,827,683 | B1 | 11/2017 | Hance et al. |

(Continued)

FOREIGN PATENT DOCUMENTS

| | | |
|---|---|---|
| CN | 107610358 | 1/2018 |
| CN | 108500998 | 9/2018 |

(Continued)

OTHER PUBLICATIONS

Written Opinion of International Searching Authority dated Jul. 9, 2021 for International Patent Application No. PCT/KR2021/003511.

(Continued)

*Primary Examiner* — Mark C Hageman
(74) *Attorney, Agent, or Firm* — PnK IP LLC

(57) ABSTRACT

A loading box changing system for a delivery robot includes a plurality of loading boxes in which parcels are loaded and which are divided into at least two types according to the characteristics of the parcels; and a delivery robot detachably coupled to any one of the plurality of loading boxes so as to make deliveries, wherein the delivery robot includes a loading unit to which the loading boxes are coupled, and a driving unit for driving the delivery robot, and a first loading box corresponding to the characteristics of the parcels from among the plurality of loading boxes can be selectively coupled to the loading unit on the basis of the characteristics of the parcels.

9 Claims, 3 Drawing Sheets

(56) References Cited

U.S. PATENT DOCUMENTS

| | | | |
|---|---|---|---|
| 9,932,019 B2* | 4/2018 | Hassounah | B60L 53/80 |
| 10,328,769 B2 | 6/2019 | Ferguson et al. | |
| 11,250,489 B2* | 2/2022 | Ferguson | G06Q 20/18 |
| 11,285,838 B2* | 3/2022 | Vliet | B60L 53/57 |
| 11,338,430 B2* | 5/2022 | Kato | B61B 13/00 |
| 11,465,292 B2 | 10/2022 | Eun et al. | |
| 11,679,968 B2* | 6/2023 | Nishimura | B65D 5/325 |
| | | | 414/331.06 |
| 2017/0100837 A1* | 4/2017 | Zevenbergen | B60L 53/80 |
| 2020/0254623 A1 | 8/2020 | Eun et al. | |
| 2023/0294935 A1* | 9/2023 | Winter | G05D 1/0225 |
| | | | 414/337 |

FOREIGN PATENT DOCUMENTS

| | | |
|---|---|---|
| JP | 2018-513817 | 5/2018 |
| KR | 10-2017-0134840 | 12/2017 |
| KR | 10-2018-0127552 | 11/2018 |
| KR | 10-2019-0143545 | 12/2019 |
| KR | 10-2078227 | 2/2020 |
| WO | 2014/011459 | 1/2014 |
| WO | 2019/023519 | 1/2019 |
| WO | 2019/240389 | 12/2019 |

OTHER PUBLICATIONS

International Search Report dated Jul. 9, 2021 in International Application No. PCT/KR2021/003511 (with English Translation).

\* cited by examiner

LOADING BOX CHANGING SYSTEM FOR DELIVERY ROBOT

CROSS REFERENCE TO RELATED APPLICATION

This application is a National Stage Entry of International Application No. PCT/KR2021/003511, filed Mar. 22, 2021, which claims priority to and the benefit of Korean Patent Application No. 10-2020-0039304, filed Mar. 31, 2020 and Korean Patent Application No. 10-2020-0090132, filed Jul. 21, 2020, each of which is hereby incorporated by reference for all purposes as if fully set forth herein.

BACKGROUND

Field

Embodiments of the invention relates generally to a loading box changing system for a delivery robot, more particularly, to a technical idea capable of satisfying various delivery requests with a single delivery robot by selectively coupling, to a driving part of the delivery robot, a loading box optimized according to a user-requested service or items to be loaded among various types of loading boxes.

Discussion of the Background

Due to difficulties in recruiting and managing manpower, rising labor costs, and increasing preference for non-face-to-face services, the demand is increasing for delivery using delivery robots rather than delivery by human.

FIG. 1 illustrates an example of a conventional delivery robot.

No matter it is a robot for delivery or other purposes, a conventional autonomous robot is designed in recognition of a driving part and a loading part as a single unit and has been utilized thereby. From such conventional point of view, it is difficult to universally satisfy the needs of consumers who want to apply autonomous robots (e.g., delivery robots) in various ways.

In addition, it is very difficult for a single user to handle multiple delivery robots depending on the purpose due to high production and operation cost of the autonomous robot. Moreover, since the type of loading item that a single delivery robot is able to load is limited depending on the loading part, there is an issue concerning the limited range of application of a single delivery robot.

Therefore, a technical idea is desired, which may greatly expand the range of user applicability for the delivery robot as loading and delivery of various types of items become possible even with a single delivery robot by making various types of loading parts selectively coupled to one driving part.

(Patent Document 1) Korean Patent (Registration No. 10-1968752, "Driving vehicle robot and product transferring apparatus having same")

The above information disclosed in this Background section is only for understanding of the background of the inventive concepts, and, therefore, it may contain information that does not constitute prior art.

SUMMARY

An object of the inventive concepts is to provide a technical idea which may greatly expand range of user applicability for delivery robots while bringing significant cost reduction for purchasing a delivery robot, because it is possible to load and deliver various types of items even with a single delivery robot by enabling selective coupling of various types of loading parts in a single driving part.

Additional features of the inventive concepts will be set forth in the description which follows, and in part will be apparent from the description, or may be learned by practice of the inventive concepts.

A loading box changing system for a delivery robot according to an example embodiment for addressing the technical issues includes a plurality of loading boxes in which delivery items are loaded and which are divided into at least two types according to characteristics of the delivery items, and a delivery robot to which any one of the plurality of loading boxes is detachably coupled to perform delivery, wherein the delivery robot includes a loading part to which the loading box is coupled and a driving part configured to drive the delivery robot, and a first loading box corresponding to the characteristic of the delivery item, among the plurality of loading boxes, is capable of being selectively coupled to the loading part based on the characteristic of the delivery item.

In addition, the plurality of loading boxes may include a power supplier in which electric power is stored, and when the power supplier is coupled with the loading part, power may be supplied from the power supplier to the driving part.

In addition, the loading box changing system for the delivery robot may include a station in which the plurality of loading boxes are stored, and when the loading boxes are stored in the station, the power supplier may be charged through the station.

In addition, the station may include station lines, each station line corresponding to each type of the plurality of loading boxes, and in one station line, one corresponding type of loading boxes may be stored.

In addition, when the driving part is connected to the station, power of the driving part may be charged.

In addition, in the loading box changing system for the delivery robot, coupling portions of the loading box and the loading part may be formed in a concave-convex shape such that they engage each other.

A loading box changing system for a delivery robot according to an example embodiment for addressing the technical issues includes a plurality of loading boxes divided into at least two types according to characteristics of a delivery item, and station lines in which the plurality of loading boxes are capable of being stored for each type, wherein, when the delivery robot with no loading box coupled is connected, a loading box corresponding to the characteristic of the delivery item among the plurality of loading boxes is coupled to the delivery robot, and when the delivery robot with the loading box coupled is connected, the coupled loading box may be separated and stored in the station line corresponding to the type of the separated loading box.

According to an example embodiment of the inventive concepts, the delivery robot may provide various types of delivery services using a single driving part, so that the cost consumption of users may be greatly reduced compared to prior cases that required involvement of separate delivery robots for each type of services, while securing the effect of reducing the production cost of delivery robots.

In addition, various types of delivery services may be provided with a single delivery robot, which brings the effect of greatly expanding the range of services provided to users within limited resources.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
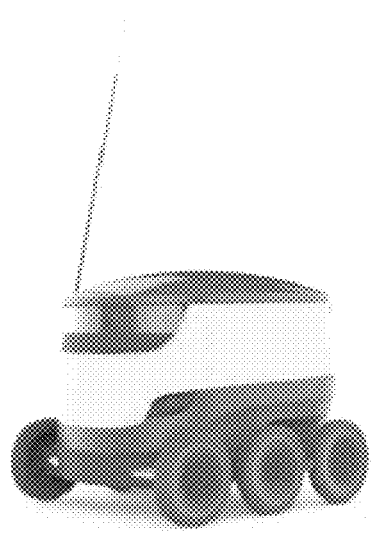
FIG. 1 illustrates an example of a conventional delivery robot according to an example embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—0 axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Because the inventive concepts may be implemented in various forms and may have various example embodiments, specific example embodiments are illustrated in the drawings and described in detail. However, this is not intended to limit the inventive concepts to specific example embodiments, and should be understood to include all modifications, equivalents, and substitutes included in the spirit and scope of the inventive concepts. In describing the inventive concepts, if it is determined that a detailed description of a related known technology may obscure the gist of the inventive concepts, the detailed description thereof will be omitted.

Terms such as first, second, and the like may be used to explain various components, but the components should not be limited to the terms. The terms are used only to distinguish one component from another component.

Terms used in the present application are only used to describe specific example embodiments, and are not intended to limit the inventive concepts. The singular forms are intended to include the plural forms unless the context clearly dictates otherwise.

The terms such as "comprise" or "have," when used in this specification, are intended to specify the presence of stated features, integers, steps, operations, elements, components, or a combination thereof, but do not preclude the presence or addition of one or more other features, integers, steps, operations, elements, components, and/or groups thereof.

Figure 2:
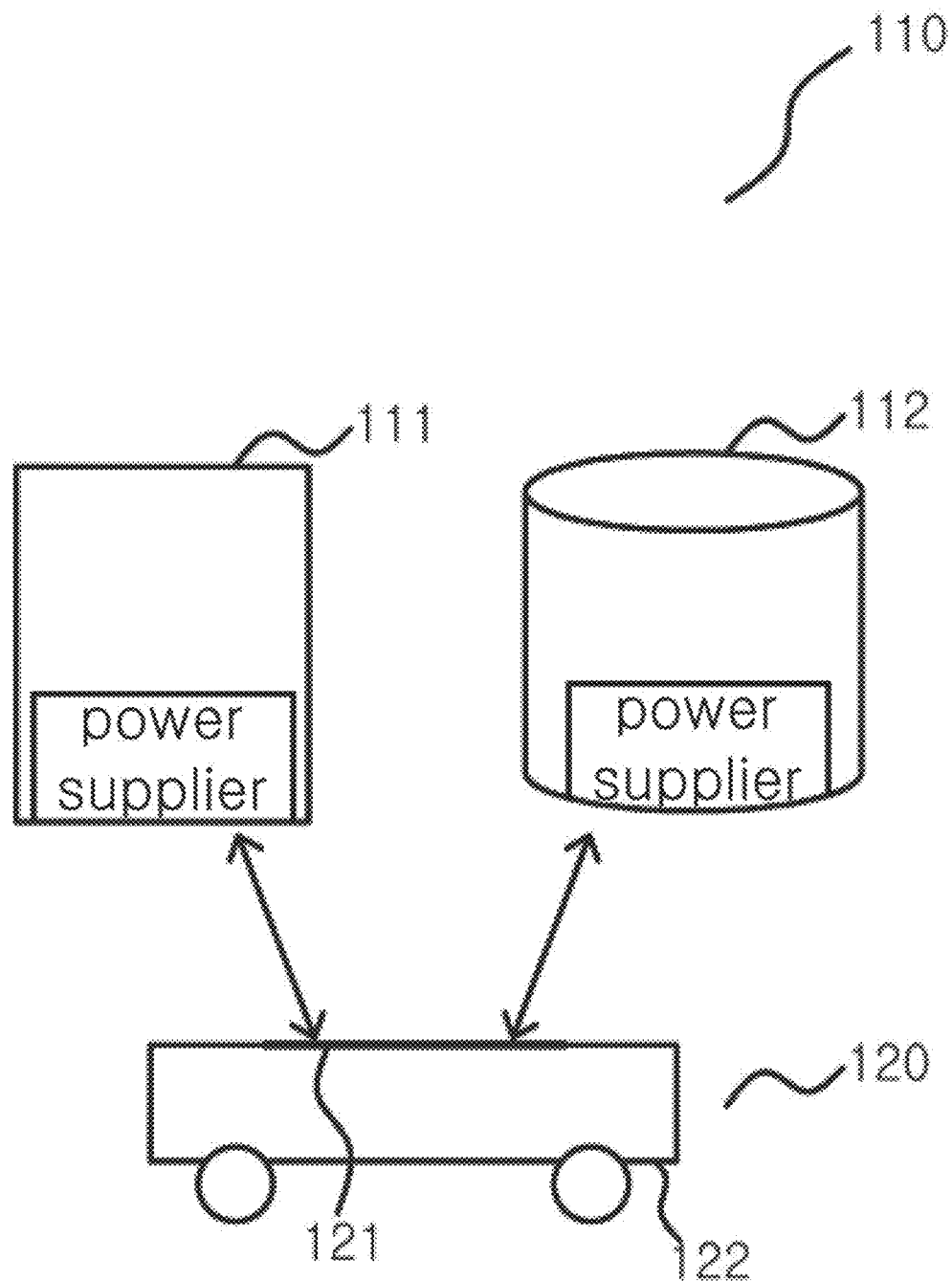
FIG. 2 illustrates a schematic configuration of a loading box changing system for a delivery robot according to an example embodiment.

FIG. 2 illustrates a schematic configuration of a loading box changing system for a delivery robot according to an example embodiment.

Referring to FIG. 2, a loading box changing system 100 for a delivery robot according to an example embodiment of the inventive concepts may include a plurality of loading boxes 110 in which delivery items are loaded and which are divided into at least two types according to characteristics of the delivery items and a delivery robot 120 to which any one of the plurality of loading boxes 110 is coupled to perform delivery. According to an example embodiment, the loading box changing system 100 for a delivery robot may further include a docking station 130 in which the plurality of loading boxes 110 are stored and which enables coupling or separation of the loading box 110 to and from the delivery robot 120.

According to an example, the type of loading boxes 110 may be divided according to the characteristics of the delivery items as described above. Hereinafter, items that are loaded and transferred by the delivery robot 120 are referred to as delivery items, but the items are not necessarily limited to delivery items that may be delivered to someone. For example, the delivery robot 120 may be used even when it is desired to transport, to a specific place, items such as food waste, general waste, recyclables, and the like. Similarly, the delivery robot 120 is only a name for convenience of description, and the use or purpose thereof is not necessarily limited to delivery. As described above, delivery of the delivery items may be variously applied depending on desires such as the transfer of specific items.

The loading boxes 110 may be divided into each different type, such as the shape and size of the loading box 110 itself as well as the shape or size of the internal loading space according to characteristics such as the type and size of the items to be loaded as described above.

In the present specification, for convenience of description, the case that the loading boxes 110 are divided into two types of first loading boxes and second loading boxes is described as an example, but the scope of the inventive concepts is not limited thereto. The types of loading boxes 110 may be divided in various ways by varying the shape or use depending on the desire. For example, the shape of the loading boxes 110 may be formed differently for each type, and even with the same shape, types may be classified according to the use thereof (e.g., for delivering hot/cold food or for collecting food waste, etc.). As such, as each different type of loading boxes 110 is selectively coupled with the delivery robot 120, the inventive concepts may have the effect of performing various tasks even with a single delivery robot 120.

Meanwhile, the delivery robot 120 may include a loading part 121 to which any one of the plurality of loading boxes 110 may be detachably coupled, and a driving part 122 configured to drive the delivery robot 120.

As described above, any one of the plurality of loading boxes 110 may be coupled to the loading part 121. In addition, the driving part 122 may include all the wheels, driving means (e.g., motor, etc.), and power suppliers used for the driving of the delivery robot 120.

A coupling method of the loading box 110 and the loading part 121 of the delivery robot 120 may be implemented in various ways. An example of the coupling method will be described with reference to FIG. 3.

Figure 3:
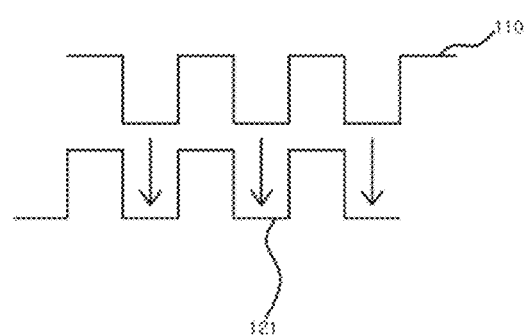
FIG. 3 illustrates an example of a coupling method of a loading box and a driving part in a loading box changing system for a delivery robot according to an example embodiment.

FIG. 3 illustrates an example of a coupling method of the loading box and the loading part in the loading box changing system for a delivery robot according to an example embodiment.

Referring to FIG. 3, in the loading box changing system 100 for a delivery robot according to an example embodiment of the inventive concepts, the coupling portion of the loading box 110 and the loading part 121 may be formed in a concave-convex shape.

Meanwhile, according to another example embodiment of the inventive concepts, a power supplier (shown but not labeled) capable of storing electric power may be formed in each of the plurality of loading boxes 110. A battery configured to store electric power may be provided on the power supplier (shown but not labeled).

In this case, when the loading box 110 is coupled to the loading part 121, the electric power stored in the power supplier (shown but not labeled) of the loading box 110 may be supplied to the driving part 122. To this end, a terminal configured to supply electric power may be formed at a coupling portion of the loading box 110 and the loading part 121. In addition, the terminal formed on the loading part 121 may be electrically connected to the driving part 122 to transmit the supplied electric power to the driving part 122. For example, when the coupling portion of the loading box 110 and the loading part 121 is formed in the concave-convex shape as illustrated in FIG. 3, a terminal for electrical connection is formed on at least a portion of each of the concave-convex shape, such that, when the loading box 110 is coupled to the loading part 121, the electric power stored in the power supplier (shown but not labeled) may be transmitted to the driving part 122 through the terminal.

According to an example embodiment, the power supplier (shown but not labeled) of the loading box 110 and the driving part 122 may transmit electric power via a wireless charging method. Because the technical idea related to wireless charging of electric power is widely known, a detailed description thereof will be omitted herein.

The driving part 122 of the delivery robot 120 generally includes its own power supplier for driving. However, when a power supplier (shown but not labeled) is provided in the loading box 110 as described above, stable driving may be possible for a relatively long time.

According to an example embodiment, the power supplier (not illustrated) of the loading box 110 and the driving part 122 may transmit electric power via a wireless charging method. Because the technical idea related to wireless charging of electric power is widely known, a detailed description thereof will be omitted herein.

The driving part 122 of the delivery robot 120 generally includes its own power supplier for driving. However, when a power supplier (not illustrated) is provided in the loading box 110 as described above, stable driving may be possible for a relatively long time.

On the other hand, according to the technical idea of the inventive concepts, a station for storage of the plurality of loading boxes 110 and automatic changing of the loading boxes 110 when the driving part 122 of the delivery robot 120 stands by may be provided. Such the station will be described with reference to FIG. 4.

Figure 4:
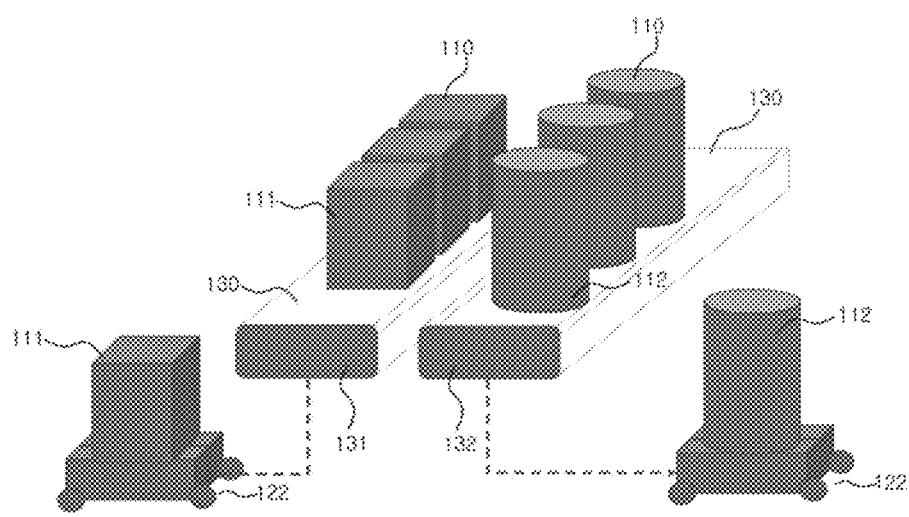
FIG. 4 is a drawing illustrating a station of the loading box changing system for a delivery robot according to an embodiment of the inventive concepts.

FIG. 4 is a drawing illustrating a station of the loading box changing system for a delivery robot according to an embodiment of the inventive concepts.

Referring to FIG. 4, the loading box changing system 100 for a delivery robot may further include a station 130 for storage of the plurality of loading boxes 110 and/or changing of the loading box 110 in the delivery robot 120.

As described above, when the power supplier (shown but not labeled) is provided in the loading boxes 110, the power supplier (shown but not labeled) may be charged through the station 130 when the loading boxes 110 are stored in the station 130.

For example, on a first line (e.g., 131) among the station lines (e.g., 131, 132), at least one first loading box 111, which is a first type of the plurality of loading boxes 110, may be stored. Similarly, on a second line (e.g., 132) of the station lines (e.g., 131, 132), at least one second loading box 112, which is a second type of the plurality of loading boxes 110, may be stored.

As described above, when the power supplier (not illustrated) is provided in the loading boxes 110, the power supplier (not illustrated) may be charged through the station 130 when the loading boxes 110 are stored in the station 130.

According to an example embodiment, the driving part 122 of the delivery robot 120 that has returned after completing the delivery or stands by without performing delivery may be connected to the station 130.

Alternatively, when the delivery robot 120 that has completed delivery is connected to the station 130 in a state in which the loading box 110 is coupled, the loading box 110 coupled to the delivery robot 120 in the station 130 may be separated and stored in station lines (e.g., 131, 132) corresponding to the type of the separated loading box 110. As such, the power supplier (shown but not labeled) of the stored loading box 110 may be charged in the station 130 as described above.

As such, in the station 130, the storage of the loading boxes 110, charging of the power supplier (shown but not labeled) of the stored loading boxes 110, and/or coupling/separation of the loading box 110 to and from the connected driving part 122 may be automatically performed.

Alternatively, when the delivery robot 120 that has completed delivery is connected to the station 130 in a state in which the loading box 110 is coupled, the loading box 110 coupled to the delivery robot 120 in the station 130 may be separated and stored in station lines (e.g., 131, 132) corresponding to the type of the separated loading box 110. As such, the power supplier (not illustrated) of the stored loading box 110 may be charged in the station 130 as described above.

As such, in the station 130, the storage of the loading boxes 110, charging of the power supplier (not illustrated) of the stored loading boxes 110, and/or coupling/separation of the loading box 110 to and from the connected driving part 122 may be automatically performed.

For example, the driving part 122 may store the characteristics (e.g., the type, size, temperature, etc. of the delivery item) of the delivery items by being input with the characteristics in advance. Such characteristics of the delivery item may be order information input when a customer places an order, or may be information input by a management entity that manages the store or the loading box changing system 100 for a delivery robot. In addition, suitable types of loading boxes 110 may be classified in advance according to the characteristics of the delivery items.

According to an example embodiment, when the driving part 122 is connected to the station 130, the power of the driving part 122 may be charged along with the coupling/separation of the loading box 110. That is, it is also possible to charge the power supplier of the driving part 122 itself separately from the power supplier (not shown but not labeled) of the loading box 110. Although a separate charging station configured to charge the driving part 122 may be provided, implementation may be possible to enable charging of the driving part 122 even through the station 130.

The charging method of the power supplier (shown but not labeled) of the loading box 110 and/or the driving part 122 in the station 130 may be implemented as desired, such as wired or wireless.

According to an example embodiment, when the driving part 122 is connected to the station 130, the power of the driving part 122 may be charged along with the coupling/separation of the loading box 110. That is, it is also possible to charge the power supplier of the driving part 122 itself separately from the power supplier (not illustrated) of the loading box 110. Although a separate charging station configured to charge the driving part 122 may be provided, implementation may be possible to enable charging of the driving part 122 even through the station 130.

The charging method of the power supplier (not illustrated) of the loading box 110 and/or the driving part 122 in the station 130 may be implemented as desired, such as wired or wireless.

The foregoing description of the inventive concepts is for illustration, and those skilled in the art to which the inventive concepts pertains can understand that modifications into other specific forms may be easily made without changing the technical spirit or essential features of the inventive concepts. Therefore, it should be understood that the example embodiments described above are illustrative in all respects and not restrictive. For example, each component described as a single type may be implemented in a distributed manner, and components described as distributed may be implemented in a combined form.

The scope of the inventive concepts is indicated by the appended claims rather than the above detailed description, and all changes or modifications derived from the meaning and scope of the claims and their equivalent concepts should be construed as being included in the scope of the inventive concepts.

The inventive concepts may be applied for a loading box changing system for a delivery robot.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. A loading box changing system for a delivery robot, the system comprising:
   a plurality of loading boxes in which delivery items are loaded and which are divided into at least two types according to characteristics of the delivery items, the plurality of loading boxes each comprising a power supplier in which electric power is stored, the characteristics comprising at least one of a type, a size, a shape, and a temperature of the delivery items; and
   a delivery robot to which any one of the plurality of loading boxes is detachably coupled to perform delivery,
   wherein the delivery robot comprises:
   a loading part to which the loading box is coupled; and
   a driving part for driving the delivery robot such that when the power supplier is coupled with the loading part, power is capable of being supplied from the power supplier to the driving part, and
   wherein a first loading box corresponding to the characteristic of the delivery item, among the plurality of loading boxes, is capable of being selectively coupled to the loading part.

2. The system of claim 1, wherein the system comprises a station in which the plurality of loading boxes are stored, and
   when the loading boxes are stored in the station, the power supplier is capable of being charged through the station.

3. The system of claim 2, wherein the station comprises station lines, each station line corresponding to each type of the plurality of loading boxes, and
   in one station line, one corresponding type of loading boxes are capable of being stored.

4. The system of claim 2, wherein the driving part comprises a power supplier, and wherein, when the driving part is connected to the station, the power supplier of the driving part is charged through the station.

5. The system of claim 1, wherein coupling portions of the loading box and the loading part are formed in a concave-convex shape such that they engage each other.

6. The system of claim 5, further comprising a terminal configured to supply electric power, wherein the terminal is formed at the coupling portions of the loading box and the loading part in order to transmit supplied electric power to the driving part.

7. The system of claim 5, wherein the coupling portions comprise a lower portion of the loading box and an upper portion of the loading part.

8. The system of claim 7, further comprising a magnet provided on at least one of the lower portion of the loading box and the upper portion of the loading part in order to provide a magnetic coupling force therebetween.

9. A loading box changing system for a delivery robot, comprising:
   a plurality of loading boxes divided into at least two types according to characteristics of a delivery item, the plurality of loading boxes each comprising a power supplier in which electric power is stored, such that when the power supplier is both coupled with the delivery robot and disposed in a corresponding one of the plurality of loading boxes, power is capable of being supplied from the power supplier to the delivery robot; and
   station lines in which the plurality of loading boxes are capable of being stored for each type,
   wherein, when the delivery robot with no loading box coupled is connected, a loading box corresponding to the characteristic of the delivery item among the plurality of loading boxes is coupled to the delivery robot, and
   when the delivery robot with the loading box coupled is connected, the coupled loading box is separated and stored in the station line corresponding to the type of the separated loading box.

* * * * *